United States Patent [19]

Imamura et al.

[11] Patent Number: 4,994,850
[45] Date of Patent: Feb. 19, 1991

[54] IMAGE FRAME SELECTING APPARATUS FOR PHOTOGRAPHIC PRINTER

[75] Inventors: Takashi Imamura; Toshiyuki Hiroishi, both of Kangawa, Japan

[73] Assignee: Fuji Photo Film Co., Ltd., Kanagawa, Japan

[21] Appl. No.: 419,248

[22] Filed: Oct. 10, 1989

[30] Foreign Application Priority Data

Oct. 12, 1988 [JP] Japan ............................ 63-256654
Nov. 17, 1988 [JP] Japan ............................ 63-290857

[51] Int. Cl.$^5$ .......................................... G03B 27/52
[52] U.S. Cl. ........................................ 355/41; 355/75; 355/35
[58] Field of Search ............................. 355/75, 41, 35

[56] References Cited

U.S. PATENT DOCUMENTS

| | | | |
|---|---|---|---|
| 3,267,800 | 8/1966 | Baillod | 355/41 |
| 3,976,376 | 8/1976 | Huser | 355/75 |
| 4,264,197 | 4/1981 | Pone et al. | 355/41 |
| 4,432,637 | 2/1984 | Baschung | 355/35 |

*Primary Examiner*—Monroe H. Hayes
*Attorney, Agent, or Firm*—Sughrue, Mion, Zinn, Macpeak & Seas

[57] ABSTRACT

An image frame selecting apparatus for a photographic printer which is adapted to designate an image frame to be printed among image frames of a short photographic film. The apparatus includes operating devices the number of which is identical with that of the image frames of the short photographic film photographed and which are arranged in correspondence with the image frames of the short photographic film, the operating devices being adapted to select an image frame to be printed; an image frame designating device for designating the image frame corresponding to an operating portion of an associated one of the operating devices; a conveying device for conveying the short photographic film; and a controlling device for controlling the conveying device in such a manner that the image frame designated by the image frame designating device is positioned to a printing position. This arrangement allows the operator to select an image frame to be printed while collating the position of the selected image frame by means of the operating portion, thereby improving the operating efficiency in selection.

17 Claims, 10 Drawing Sheets

F I G. 1
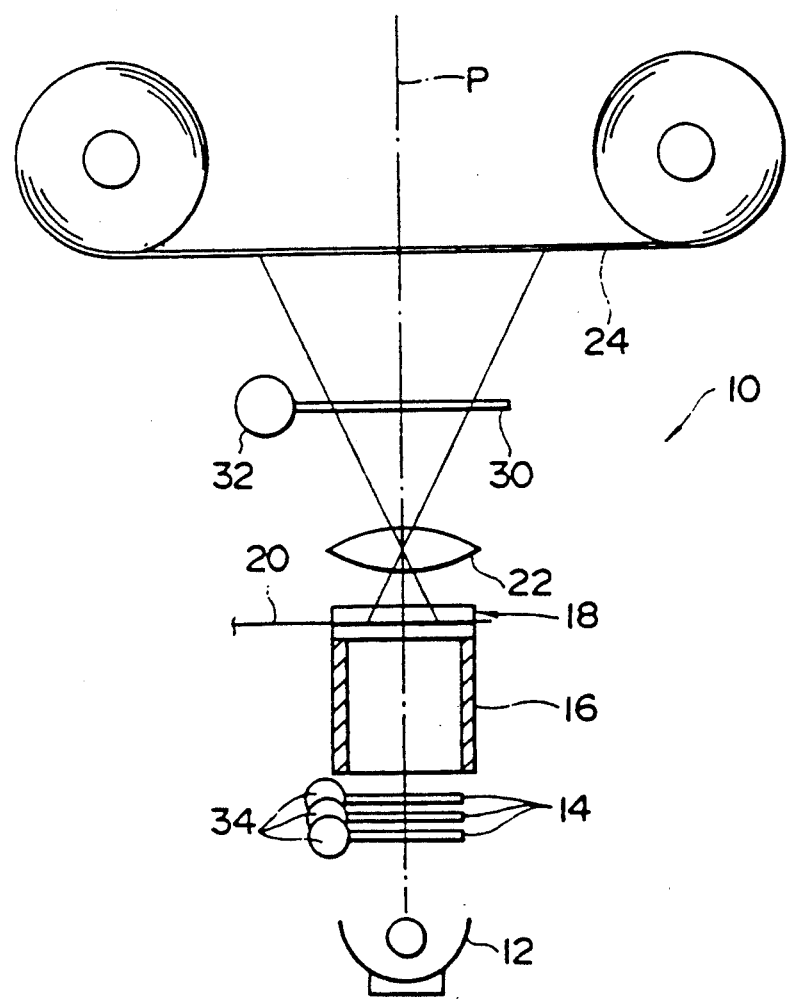

IMAGE FRAME SELECTING APPARATUS FOR PHOTOGRAPHIC PRINTER

BACKGROUND OF THE INVENTION

1. Field of the Invention

The present invention relates to an image frame selecting apparatus for a photographic printer for printing only the image of an image frame specified among a predetermined number of image frames photographed on a short photographic film.

2. Description of the Related Art

A so-called film carrier (negative carrier) is generally used when an image is printed on photographic paper after development of a negative film.

The negative carrier is provided with a negative film conveying passage, and is moved by being guided by the negative film conveying passage. The negative film conveying passage is provided with a printing aperture for one image frame at an intermediate portion thereof in a film conveying direction. This printing aperture serves as the position of application of light from a printing light source at the time when the negative film is inserted into the printer. Accordingly, the image frame of the negative film positioned at this printing aperture is printed.

At this juncture, the negative film is normally conveyed consecutively to the negative carrier in a state in which a plurality of long negative films (one-film portions) are connected to each other by means of splicing tape. Accordingly, if the position of a leading image frame is detected, with respect to one negative film, if the film is fed by a fixed amount, it is possible to consecutively position the adjacent image frames to the printing position. In addition, the respective frames are provided with notches, so that by detecting this notch the positioning can be effected accurately.

However, since the above-described conventional printer is designed for long negative films, in cases where printing is carried out by using piece negatives (short negative films generally cut into six frames) at the time of reception of an order for extra printing or the like, no means is conventionally available for designating an image frame of the piece negative. For this reason, in order to position an image frame to be printed to the printing position, it is necessary to make the piece negatives into an elongated shape by connecting them together by splicing tape or the like and to input the positional information of the image frame, with the result that it is impossible to effect printing processing while viewing a negative image in real time.

In addition, when it is desired to effect the printing of an image of another image frame within the piece negative again after completion of the printing of an image of one image frame, a feeding operation or a fine adjustment operation is needed, so that the operating efficiency is poor. Furthermore, since the determination as to whether or not a designated image frame has been positioned properly in the printing position is based on a visual check, skill is required, and particularly in the case of an image frame photographed on a half-size film, printing errors are prone to occur.

SUMMARY OF THE INVENTION

Accordingly, a first object of the present invention is to provide an image frame selecting apparatus for a photographic printer which is adapted to designate image films to be printed among the image frames of a short photographic film and is hence capable of automatically positioning the designated image frames consecutively to a printing position, thereby improving the operating efficiency.

To this end, in accordance with the present invention, there is provided an image frame selecting apparatus for a photographic printer which is adapted to designate an image frame to be printed among image frames of a short photographic film, comprising: operating means the number of which is identical with that of the image frames of the short photographic film photographed and which are arranged in correspondence with the image frames of the short photographic film, the operating means being adapted to select an image frame to be printed; image frame designating means for designating the image frame corresponding to an operating portion of an associated one of the operating means; conveying means for conveying the short photographic film; and controlling means for controlling the conveying means in such a manner that the image frame designated by the image frame designating means is positioned to a printing position, whereby the designated image frames to be printed are consecutively positioned automatically to the printing position.

A second object of the present invention is to provide an image frame selecting apparatus for a photographic printer which, at the time of printing all the image frames of a short photographic frame, is capable of effecting an selecting operation therefore collectively, thereby improving the operating efficiency in selection.

To this end, in accordance with the present invention, there is provided an image frame selecting apparatus for a photographic printer which comprises collective designation operating means for collectively designating all the image frames of the short photographic film as image frames to be printed.

When an image frame is to be printed is designated among the image frames of a short photographic film by operating an operating portion, since the operating portions are provided in a number identical with that of the image frames photographed on the short photographic film and are disposed in correspondence with an array of the image frames of the short photographic film, it is possible to perform the designation while collating the position of the image frame selected, so that the operating efficiency in selection can be improved.

The image frame thus selected is positioned to the printing position by the conveying means to effect printing processing. Upon completion of the printing of one image frame, the controlling means controls the conveying means in such a manner as to locate to the printing position an ensuing image frame to be printed among the image frames designated by the image frame selecting means. Therefore, the image frames to be printed can be automatically positioned consecutively to the printing position, so that the complicatedness involved in fine adjustment or the like can be overcome.

Furthermore, at the time of printing by selecting all the image frames of a short photographic film, it is possible to select all the image frames through a single operation by operating the collective designation operating means. When all the image frames are selected, an image frame at one end of the short photographic film is positioned, and on completion of the printing thereof the adjacent image frames to be subsequently printed are automatically positioned consecutively to the printing position.

The above and other objects, features and advantages of the present invention will become more apparent from the following detailed description of the invention when read in conjunction with the accompanying drawings.

BRIEF DESCRIPTION OF THE DRAWINGS

FIGS. 1 to 6 are diagrams relating to a first embodiment of the present invention, in which FIG. 1 is a schematic diagram of a photographic printer;

FIG. 2 is a perspective view of a negative carrier mounted on the printer and a selection device;

FIG. 3 is a top plan view of the negative carrier;

FIG. 4 is a top plan view of the selection device;

FIG. 5 is a control block diagram;

FIG. 6 is a flowchart for controlling printing processing in a case where a short negative film is used;

FIG. 8 is a top plan view of the selection device;

FIG. 9 is a control block diagram; and

FIG. 10 is a flowchart for controlling printing processing in a case where a short negative film is used.

DESCRIPTION OF THE EMBODIMENTS

Figure 2:
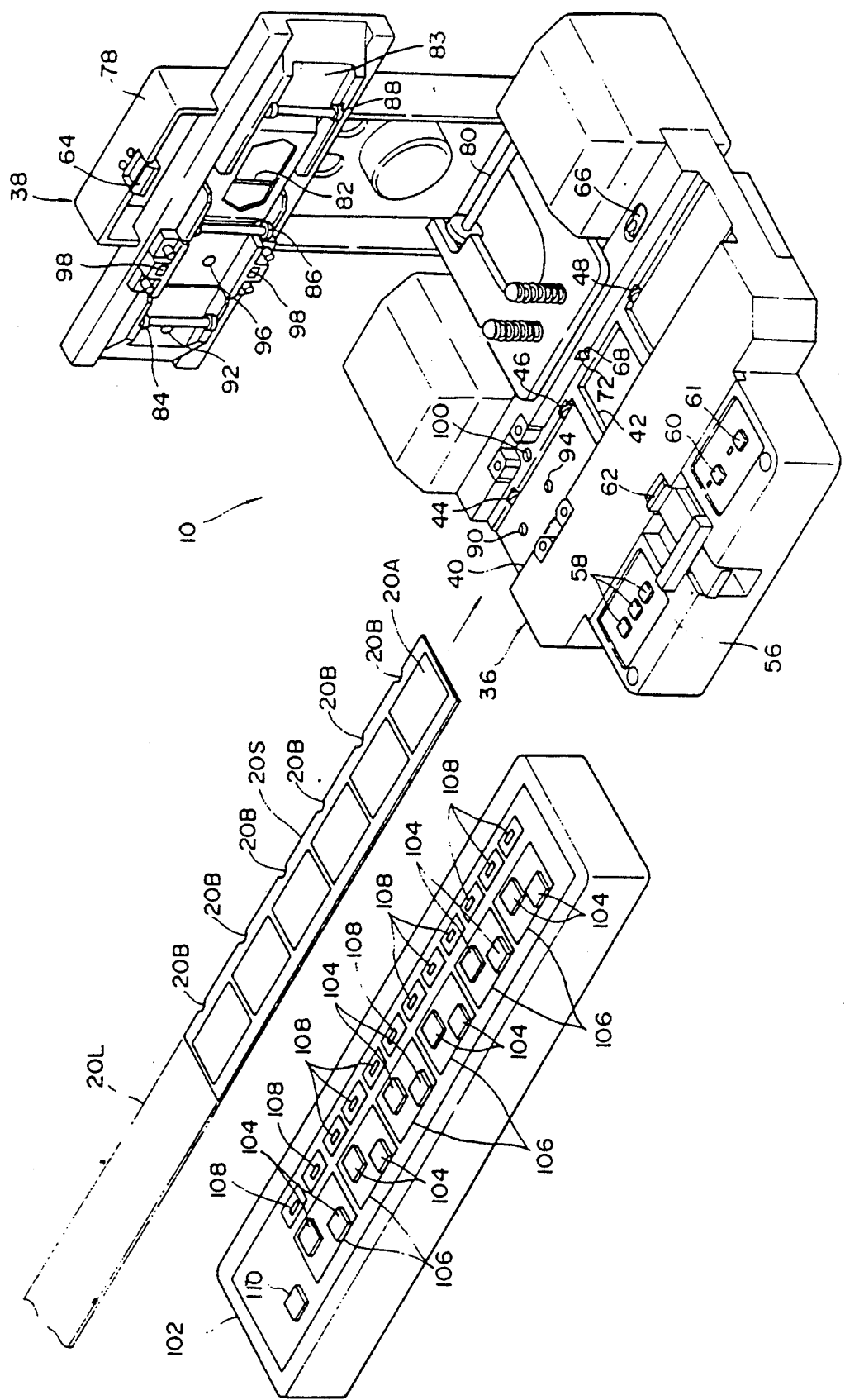

Referring now to the accompanying drawings, a description will be given of the preferred embodiments of the present invention.

FIGS. 1 to 5 illustrate a photographic printer 10 to which an image frame selecting apparatus in accordance with a first embodiment of the present invention is applied. The printing light emitted from a printing light source 12 is applied to a negative film 20 disposed on a negative carrier 18 via filters 14 and a light diffusing barrel 16.

It should be noted that the types of negative film 20 include a long negative film 20L and a short negative film 20S obtained by cutting a film into a unit of six image frames 20A. In the following description, however, the negative film will be simply referred to as the negative film 20 where appropriate, and a description will be given separately for the long negative film 20L and the short negative film 20S, as necessary.

The light transmitted through the image of the image frame 20A photographed on the negative film 20 is applied to printing paper 24 via a lens unit 22, and the image is printed on the printing paper 24. This printing processing is controlled by a control unit 26 shown in FIG. 5, and an operation button 28 for starting the printing processing is connected to this control unit 26. A shutter 30 is interposed between the lens unit 22 and the printing paper 24, and this shutter 30 is connected to the control unit 26 via a driver 32 and is adapted to open or close an optical path in correspondence with an exposure. In addition, the filters 14 are also connected the control unit 26 via drivers 34 and are adapted to move into or out of the optical path by means of signals from the control unit 26.

Figure 3:
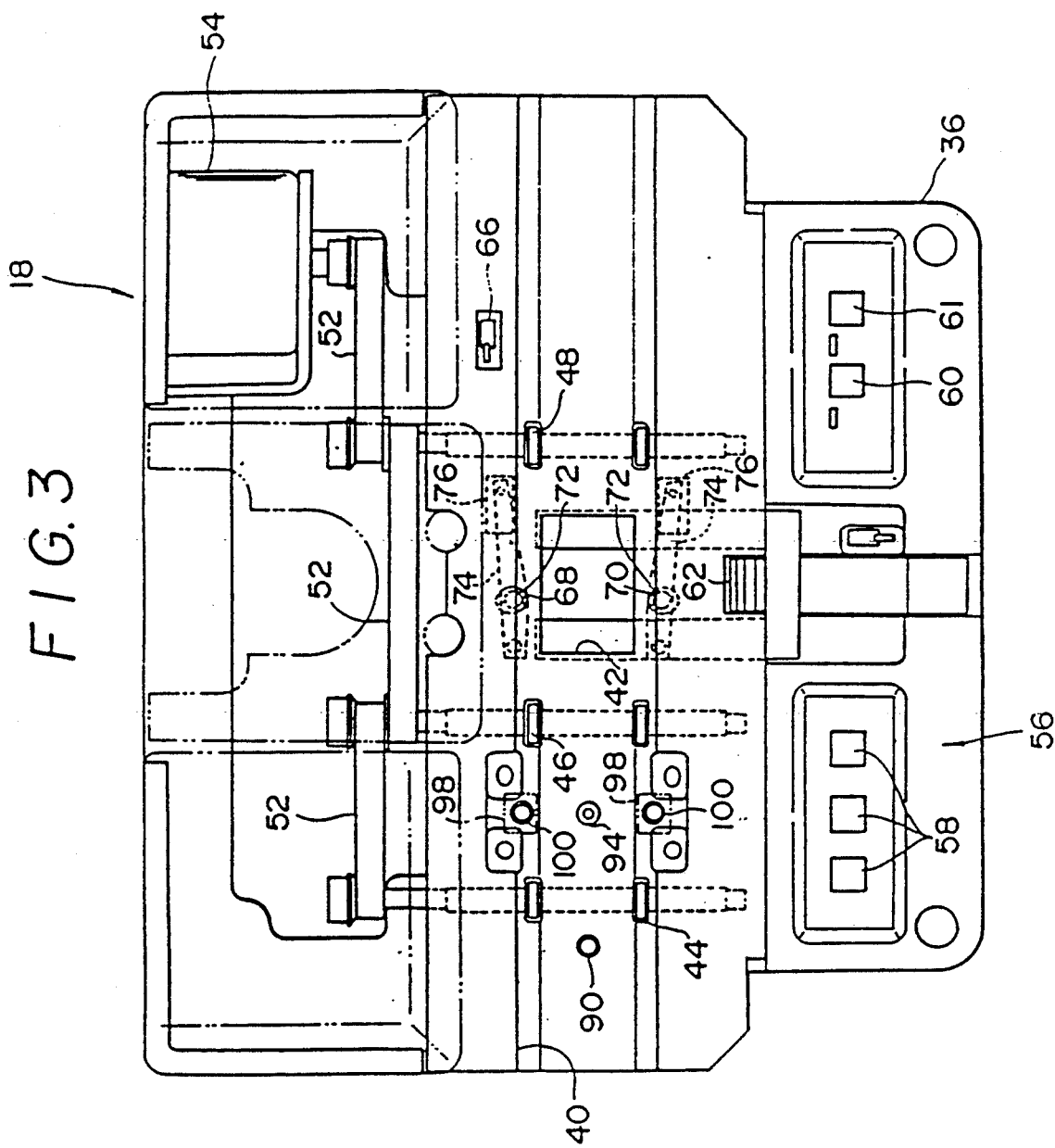

As shown in FIGS. 2 and 3, the negative carrier 18 comprises a base 36 and an opening/closing cover 38 as its major components.

The base 36 has a negative film conveying passage 40 formed therein, a printing aperture 42 being provided in a longitudinally central portion of the negative film conveying passage 40 to serve as a port for the application of light from the printing light source 12 of the photographic printer 10. In the negative film conveying passage 40, pairs of conveying rollers 44, 46, 48 serving as conveying means are disposed on the upstream side of the printing aperture 42 (on the left-hand side as viewed in FIG. 3) and on the downstream side thereof (on the right-hand side as viewed in FIG. 3) in correspondence with the rear surface (underside) of the negative film 20. Rotating shafts 50 of the conveying rollers 44, 46, 48 are adapted to rotate in the same rotating direction at the same rotating speed via timing belts 52 upon receiving the driving forces of a motor 54 which is driven by pulse signals from the control unit 26.

An operation panel 56 disposed on a front surface of the negative carrier 18 is provided with operation buttons 58 for manually adjusting the negative film 20 positioned in the negative film conveying passage 40 or for effecting frame feeding; a drive key 60 for consecutively positioning image frames to the printing position; and a pass key 61 for passing an image frame to an ensuing one. Signal lines of these components are connected to the control unit 26.

A latch 62 is provided on a breadthwise central portion of the operation panel 56 and corresponds to a hook 64 provided on an opening/closing cover 38 which will be described later. The arrangement is such that as the hook 64 is engaged with the latch 62, the opening/closing cover 38 can be held in a closed state. In addition, a limit switch 66 is provided on the base 36 in the vicinity of the negative film conveying passage 40 so as to allow a contact to be changed over with the opening/closing cover 38 in the open and closed states. In other words, the limit switch 66 is connected to the control unit 26, and the open and closed states of the opening/closing cover 38 can be detected by the state of energization of this limit switch 66.

A pair of elongated holes 68, 70 are provided at widthwise opposite ends of the negative film conveying passage 40 provided in the base 36 in such a manner as to be located slightly upstream to an optical axis P. The elongated holes 68, 70 are arranged such that their longitudinal direction is parallel with the widthwise direction of the negative film 20 placed in the negative film conveying passage 40. Accommodated respectively in the elongated holes 68, 70 are notch detecting pins 72. Each of the notch detecting pins 72 corresponds to a photosensor 76 via a lever 74 and is adapted to open or close the optical path of the light applied to a light-receiving portion of the photosensor 76 from a light-projecting portion thereof on the basis of the presence of a notch provided at each widthwise opposite end of the negative film 20 being conveyed. The photosensors 76 are connected to the control unit 26 so that the presence of notches can be detected on the basis of the detected values of the photosensors 76.

The opening/closing cover 38 is arranged such that a lower end of a case-like cover body 78 is pivotally supported by a bar 80 secured to the base 36, and the opening/closing cover 38 can be opened or closed about this bar 80 with respect to the base 36.

A through-hole 82 corresponding to the printing aperture 42 is provided in a bottom portion of the cover body 78. In addition, the cover body 78 is provided with an upper guide base 84 at a position corresponding to the negative film conveying passage 40 in a closed state.

Pairs of idle rollers 84, 86, 88 are provided on the upper guide base 84 in correspondence with the conveying rollers 44, 46, 48 in such a manner that, with the opening/closing cover 38 closed, the negative film 20 is clamped by these idle rollers 84, 86, 88 and the conveying rollers 44, 46, 48 so as to impart a conveying force to the negative film 20.

In the negative film conveying passage 40, a light-projecting portion 90 of a density detecting sensor and a light-projecting portion 94 of a splice detecting sensor are disposed on the upstream side of the printing aperture 42 in the order mentioned starting with the upstream side of the conveying passage 40. The light emitting surfaces of these light-projecting portions are made flush with the surface of the negative film conveying passage 40.

Green light is applied from the light-projecting portion 90 of the density detecting sensor and is transmitted through the negative film 20 being conveyed. The arrangement is such that this transmitted light is detected by a light-receiving portion 92 of the density detecting sensor which is opposed to the light-projecting portion 90 with the opening/closing cover 38 closed. Since each image frame 20A has a higher density than the remaining portion of the negative film 20, an edge of the image frame 20A can be detected on the basis of a detected value of the density detecting sensor. The distance between this detecting position and the optical axis P is stored in advance in the control unit 26, and the image frame 20A of the negative film 20 can be positioned positively at the printing position as the conveying rollers 44, 46, 48 are driven by a predetermined number of pulses upon detection of the edge.

Meanwhile, red light is applied from the light-projecting portion 94 of the splice detecting sensor and is transmitted through the negative film 20 being conveyed. The arrangement is such that this transmitted light is detected by a light-receiving portion 96 of the splice detecting sensor which is opposed to the light-projecting portion 94 with the opening/closing cover 38 closed. When the splicing tape passes through the splice detecting sensor, the detected value of the light-receiving portion 96 differs, so that a spliced portion of the negative film 20 can be detected through this detection.

A bar code detecting sensor 98 connected to the control unit 26 is buried at a position of the opening/closing cover 38 opposing the negative film conveying passage 40. This bar code detecting sensor 98 is disposed in face-to-face relation with a light source 100 and is adapted to be capable of positively reading a bar code attached to the negative film 20 passing over the light light 100.

Figure 4:
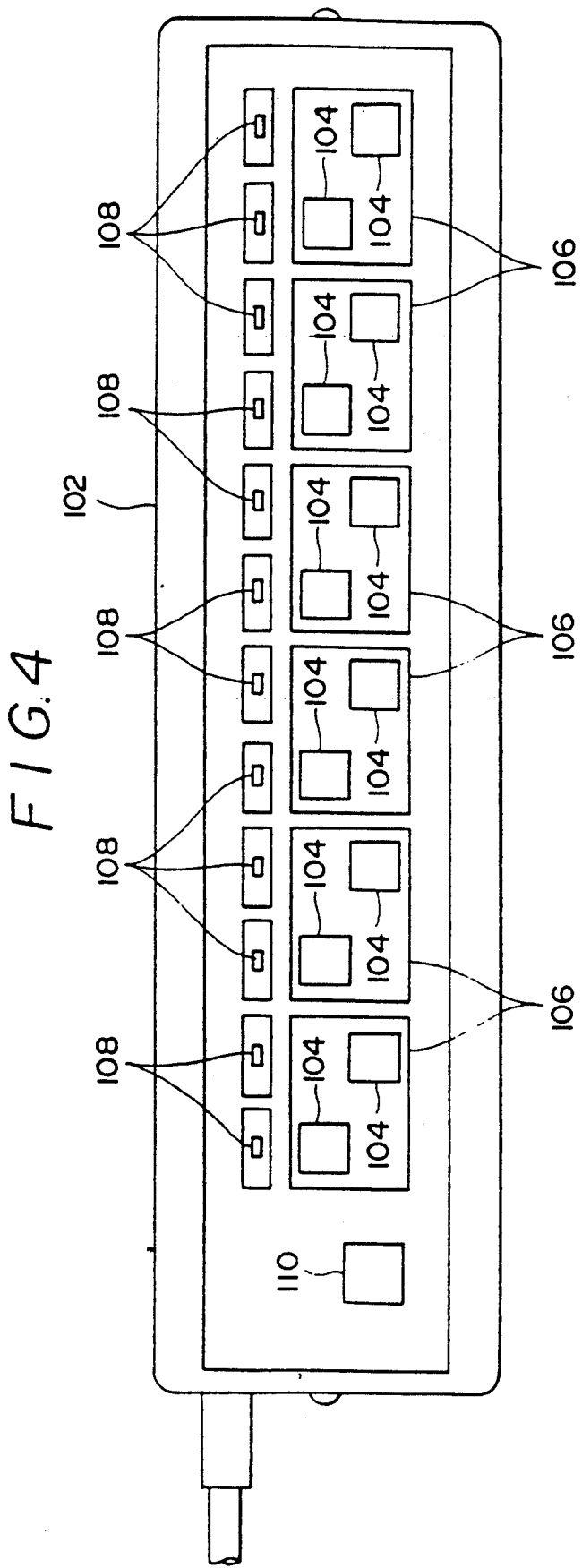
Figure 5:
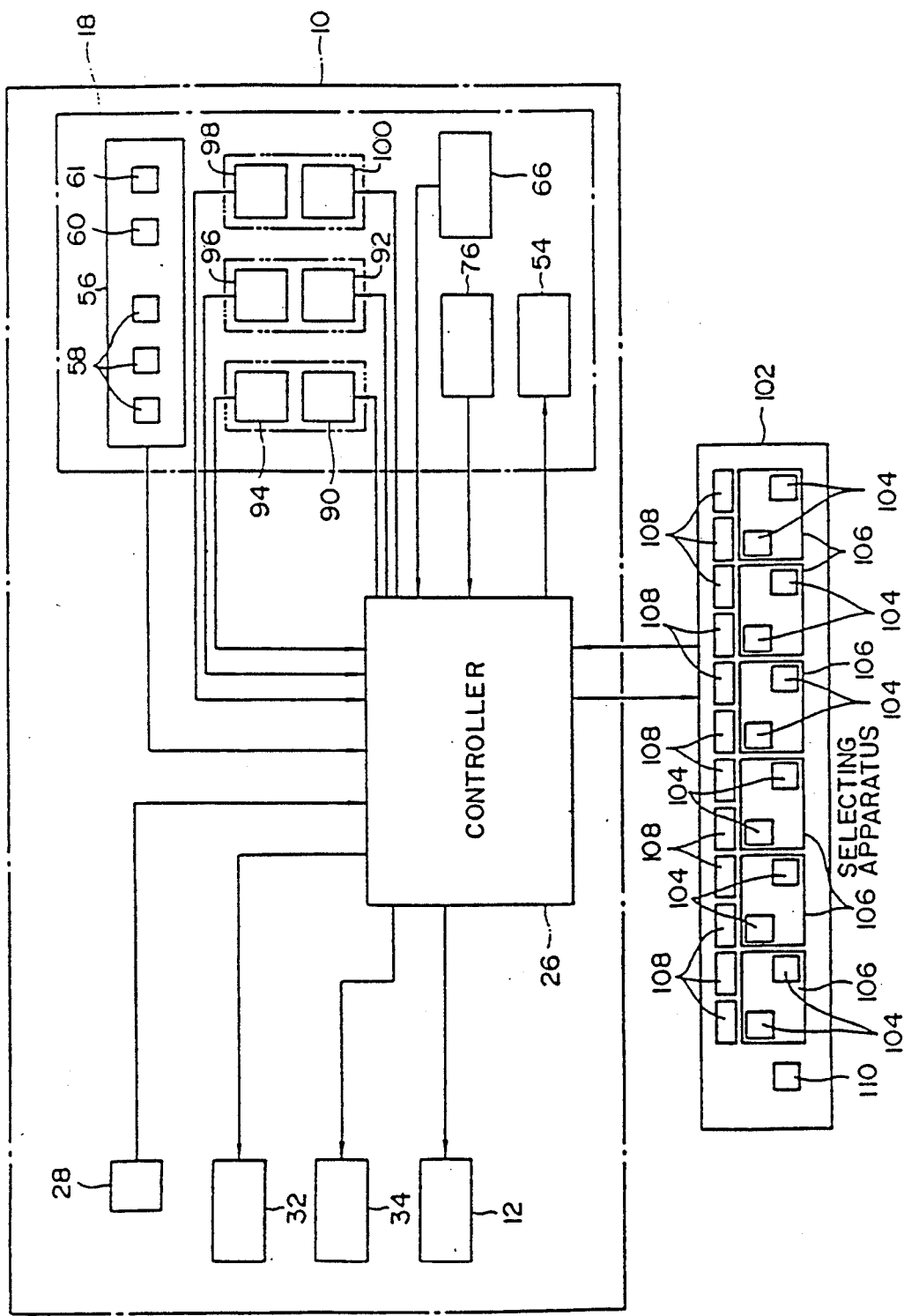

As shown in FIG. 4, an image frame selecting apparatus 102 for the short negative film 20S, which is applied at the time when an order for extra printing is received, is separatively mounted on the photographic printer 10 in accordance with this embodiment. The arrangement is such that, by operating this image frame selecting apparatus 102, it is possible to control the conveyance and positioning of the short negative film 20S by means of the negative carrier 18.

The image frame selecting apparatus 102 has 12 selection switches 104 arranged in pairs. Each pair of selection switches 104 is arranged on a diagonal line of a frame 106 formed on a panel of the selecting apparatus 102, and these frames 106 are juxtaposed at equal intervals in a horizontal direction. The size of the frame 106 is set to be substantially identical with that of the image frame on the negative film. The arrangement is such that after the short negative film 20S is placed along the frames 106, a corresponding frame is selected, so that a specified one of the image frames 20A to be printed can be selected from the short negative film 20S. The reason for the provision of two selection switches 104 for each frame 106 is to make it possible to cope with the selection of half side image frames. Accordingly, in the case of a full-size image frame, only the lower selection switch 104 within each of the frames 106 is used. A code may be provided on top of the selection switch 104 so as to prevent an erroneous operation.

An LED 108 is disposed alongside each of the frames 106 in correspondence with the selection switch 104 and is adapted to be lit or flicker when the corresponding selection switch 104 is operated. Red and green are used as the luminescent colors of the LED 108, and are arranged alternately in the order of, for instance, red, green, red, green, ..., starting with the left-hand side in FIG. 4. Accordingly, in the cases of full-size image frames, only the green LEDs 108 are lit, and it is hence possible to confirm visually whether or not the operation of the selection switch 104 has been carried out accurately.

A return switch 110 is provided on the left-hand side of the leftmost from 106, as viewed in FIG. 4, of the selecting apparatus 102, so that a finally printed image frame can be repositioned to the printing position by operating this return switch 110. When the short negative film 20S is inserted into the negative carrier 18, the control unit 26 is adapted to automatically drive the motor 54 so that a leading one of the image frames selected by the selection switches 104 can be positioned to the printing position. The printing of an image frame thus positioned to the printing position is carried out by operating the printing start operating button 28 provided on the photographic printer 10. Upon completion of the printing, the control unit 26 causes the motor 54 to start to drive immediately so that an ensuing image frame selected can be positioned to the printing position.

It should be noted that this automatic conveyance is effective only when the drive key 60 provided on the operation panel 56 of the negative carrier 18 is ON. Accordingly, when it is desired to print a plurality of the same images after completion of a printing, it suffices if the drive key 60 is turned OFF after the positioning of that image frame is completed. If the pass key 61 on the operation panel 56 is operated, the drive key 60 is turned ON, allowing the automatic conveyance to be resumed.

A description will now be given of the operation of this embodiment.

First, a description will be given of a normal printing procedure, i.e., the procedure for performing printing processing by using the long negative film 20L.

If the long negative film 20L is supplied to the negative carrier 18, the long negative film 20L is clamped by the conveying rollers 44, 46, 48 and the idle rollers 84, 86, 88, is thereby given a conveying force, and is conveyed while it is guided by the negative film conveying passage 40.

In the negative film conveying passage 40, the long negative film 20L first passes between the light-projecting portion 90 and light-receiving portion 92 of the density detecting sensor. Here, since the density of the image frame 20A differs appreciably from that of the remaining portion, it is possible to detect an edge of the image frame 20A. If the conveying rollers 44, 46, 48 are driven by a predetermined number of pulses upon detection of this frame edge, the first image frame 20A can be positioned accurately with respect to the optical axis P. Subsequently, as the long negative film 20L is conveyed consecutively by each predetermined number of pulses, the ensuing image frames 20 can be positioned consecutively with respect to the optical axis P.

The light-projecting portion 94 and light-receiving portion 96 of the splice detecting sensor are provided downstream to the density detecting sensor, and the long negative film 20 passes therebetween. As a result, it is possible to detect a spliced portion of the long negative film 20L, and when it is detected, the edge of an initial one of the image frames 20A is detected by the density detecting sensor.

In addition, since the bar code detecting sensor 98 is capable of reading a bar code specifying a frame number of of the long negative film 20L and a bar code specifying a type of film, it is possible to specify a desired one of the image frames 20A and effect exposure correction based on a difference in the film type.

As for the image frame 20A which has moved to the vicinity of the optical axis P, since the notch detecting pin 72 enters a notch 20B of the long negative film 20L, it is possible to detect the presence of the notch 20B, so that a determination can be made as to whether or not it is a proper image frame 20A for printing.

Figure 6:
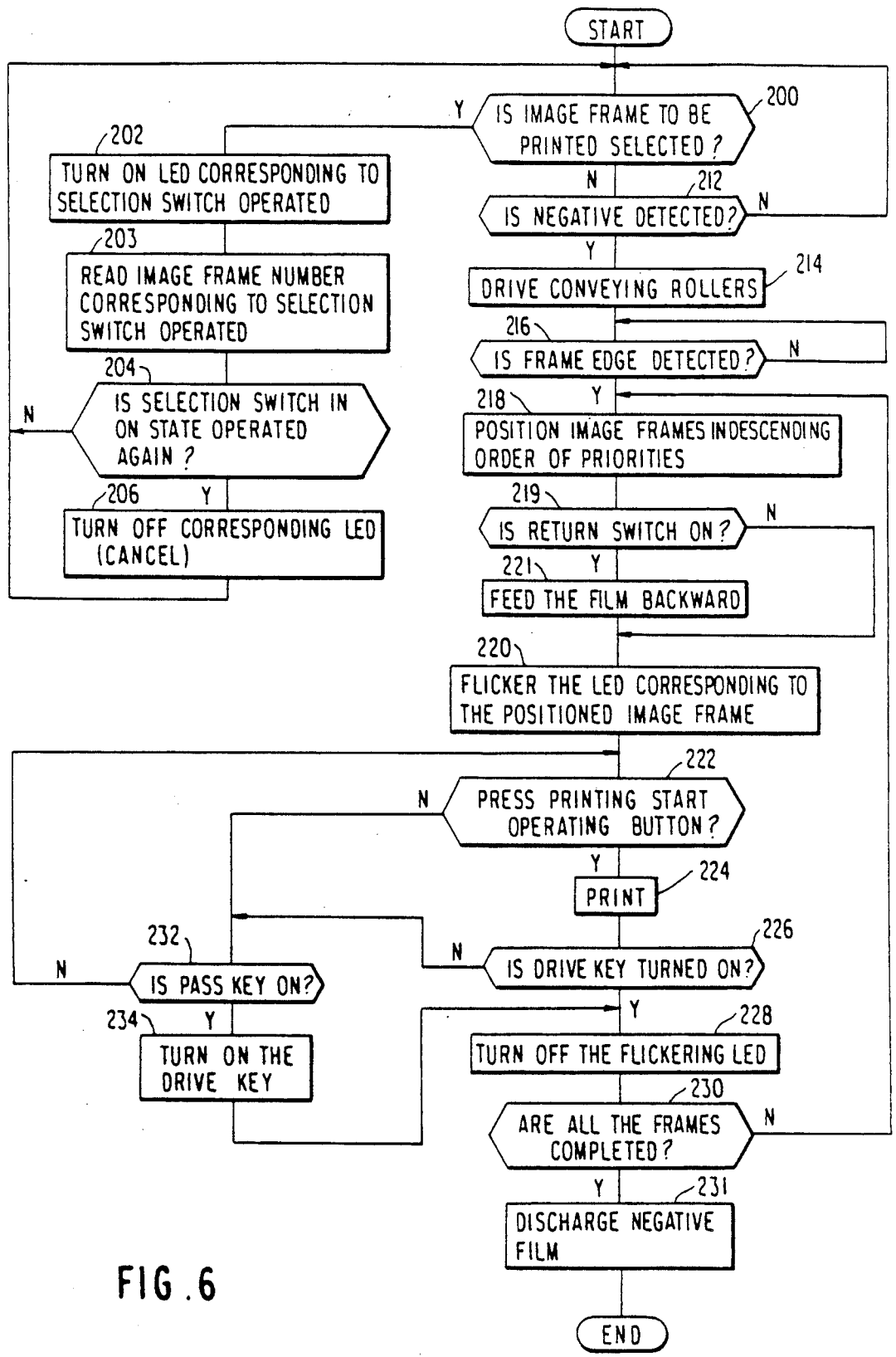

Referring now to the flowchart of FIG. 6, a description will be given of the case of effecting printing processing by using the short negative film 20S.

First, in Step 200, a selection switch 104 corresponding to an image frame 20A to be printed is manually operated among the selection switches 104 of the image frame selecting apparatus 102. When the image frame 20A is selected, the operation proceeds to Step 202 to turn on the corresponding LED 108. In this case, since the image frame 20A photographed on the short negative film 20S is a full-size, only the green LEDs 108 are used. In Step 203, information on the selection of an image frame selected by the image frame selecting apparatus 102 is sent to the control unit 26, and the order of the image frame 20A corresponding to the selection switch 104 for which a corresponding one of the LEDs 108 is lit is read. Namely, the serial numbers of the image frames to be printed are read in the order starting with the rightmost one of the image frames placed on the image frame selecting apparatus 102 shown in FIG. 4 (it is assumed that, for example, first and fourth image frames have been selected). In an ensuing Step 204, when it is desired to cancel the image frame 20A which has been selected, the selection switch 104 is operated again. As a result, the corresponding LED 108 is turned off (Step 206), making it possible to cancel the selected image frame 20A. Thereafter, if the Steps 200 through 206 are repeated, it is possible to select a plurality of image frames 20A.

In Step 200, if the selection switch 102 is not operated, the operation proceeds to Step 212 to determine whether or not the short negative film 20S has been inserted into the negative carrier 18. This determination can be made on the basis of a detected value of the light-receiving portion 94 of the density detecting sensor, and when it is detected, the operation proceeds to Step 214 where the driving of the conveying rollers 44, 46, 48 is commenced, and, in Step 216, the edge of the initial image frame 20A is detected.

When the frame edge is detected, the operation proceeds to Step 218, the image frames 20A are positioned to the printing position, starting with the higher order (in the above-described example, first with the first image frame from the right and then the fourth image frame).

Upon completion of the positioning, the operation proceeds to Step 219 to determine whether or not the return switch 110 has been operated. If NO is the answer, the operation proceeds to Step 220 to cause the LED 108 corresponding to the positioned image frame to flicker. Thus, in Step 220, since the corresponding LED 108 is made to flicker, the completion of position can be confirmed visually. Here, if YES is the answer in Step 219, the finally printed image frame is moved back to the printing position in Step 221, and then the operation proceeds to Step 220. Incidentally, in a case where no printing has been effected, this control is cancelled.

In Step 222, a determination is made as to whether or not the printing start operating button 28 of the printer 10 has been operated. If YES is the answer, the operation proceeds to Step 224 to effect printing processing. In an ensuing step 226, a determination is made as to whether or not the drive key 60 of the negative carrier 18 is on. If YES is the answer, the operation proceeds to Step 228 to turn off the currently flickering LED 108. Then, the operation proceeds to Step 230 to determine whether or not there is any selected image frame 20A in the loaded short negative film 20S. In the above-described example, since it is necessary to print the image frame 20A corresponding to the fourth frame 106 from the right in FIG. 4, the operation proceeds to Step 218 to repeat the aforementioned steps. In addition, when the printing of all the necessary image frames has been completed, the operation proceeds to Step 231 in which the short negative film 20S loaded in the negative carrier 18 is discharged, thereby completing this routine.

In Step 222, in a case where the printing start operating button 28 is not operated, the operation proceeds to Step 232 to determine whether the pass key 61 on the operation panel 56 has been turned on. If YES is the answer, the drive key 60 is turned on (there are cases where it is already on) without printing the image frame 20A which was to be printed, and the operation proceeds to Step 228 to repeat the aforementioned steps. On the other hand, if it is determined in Step 232 that the pass key 61 has not been operated, the operation proceeds to Step 222 and Steps 222 and 232 are repeated until either the printing start operating button 28 or the pass key 61 is operated.

Meanwhile, in a case where it is determined in Step 226 that the drive key 60 has not been turned on, the operation proceeds to Step 232 and then to Step 222. As a result, it is possible to print a plurality of image frames 20A consecutively positioned at the printing position. Upon completion of this printing, the operation proceeds from Step 232 to Step 234 to turn on the drive key 60, and then returns to Step 228.

Thus, in this embodiment, it is possible to automatically effect printing processing by using the short negative film 20S in the same way as the long negative film 20L, so that it is possible to facilitate the positioning of the image frames 20A of the short negative film 20S which has conventionally required skill, and the operating efficiency can be enhanced at the time when an order for extra printing is received.

In addition, since the image frame 20A once positioned on the negative carrier 18 is conveyed by fixed-amount feeding, even if the film is moved manually through frame feeding or fine adjustment, it is possible to automatically effect positioning by adjusting the amount of movement without newly inputting positional information or the like at the time of positioning an ensuing image frame 20A to be printed. Also, it should be noted that although the positioning of the image frame is effected by fixed-amount feeding, in a case where the notch 20B is detected during this fixed-amount feeding, positioning may be carried out by placing a priority on the detection of the notch 20B.

Furthermore, since the arrangement is such that once printing is completed and even after an ensuing image frame 20A has been positioned to the printing position, by operating the return switch 110, it is possible to reposition the finally printed image frame 20A to the printing position, so that the degree of freedom in operation is enhanced.

Figure 7:
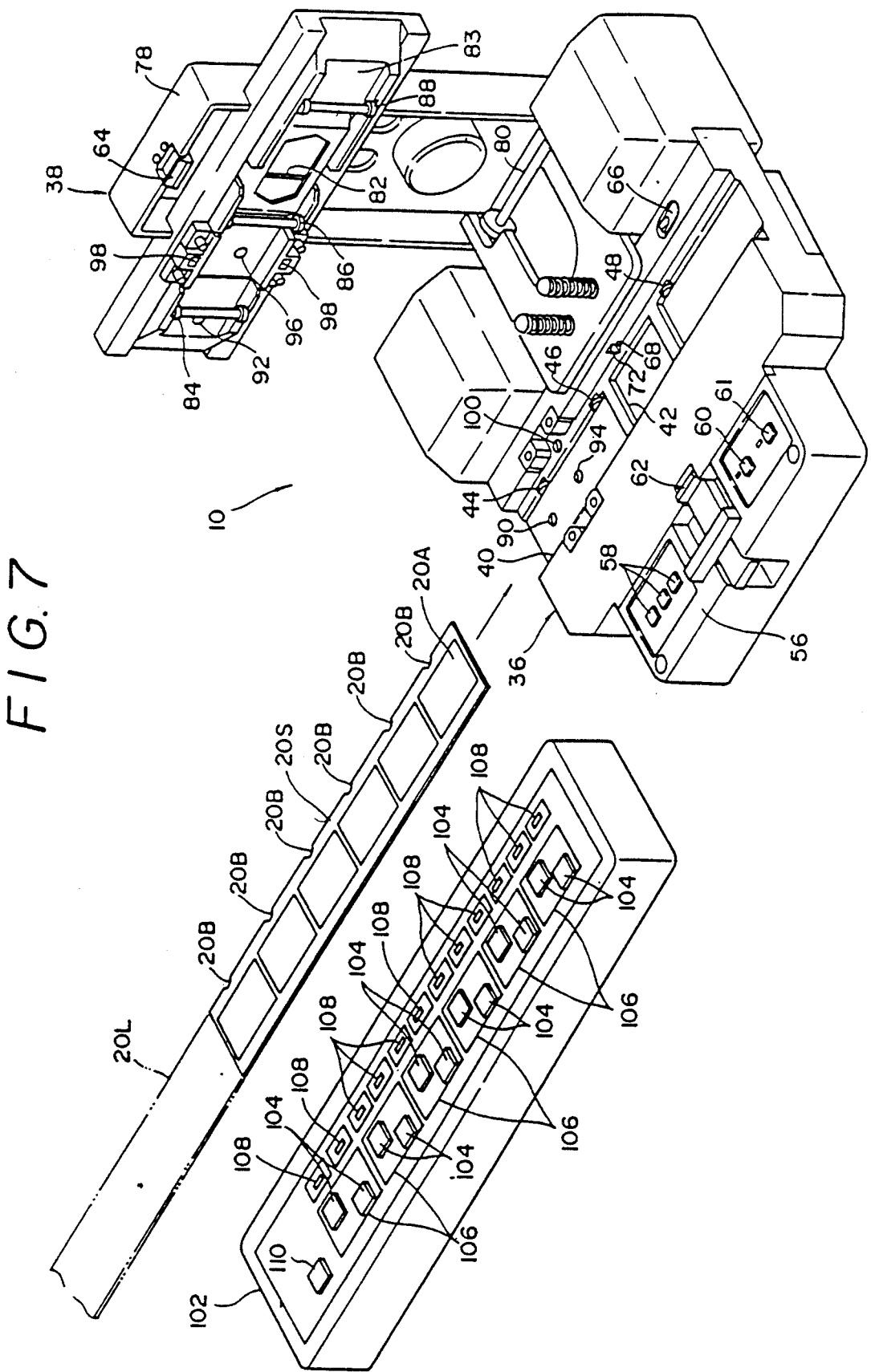
FIGS. 7 to 10 are diagrams relating to a second embodiment of the present invention, in which FIG. 7 a perspective view of the negative carrier mounted on the printer and the selection device.
Figure 8:
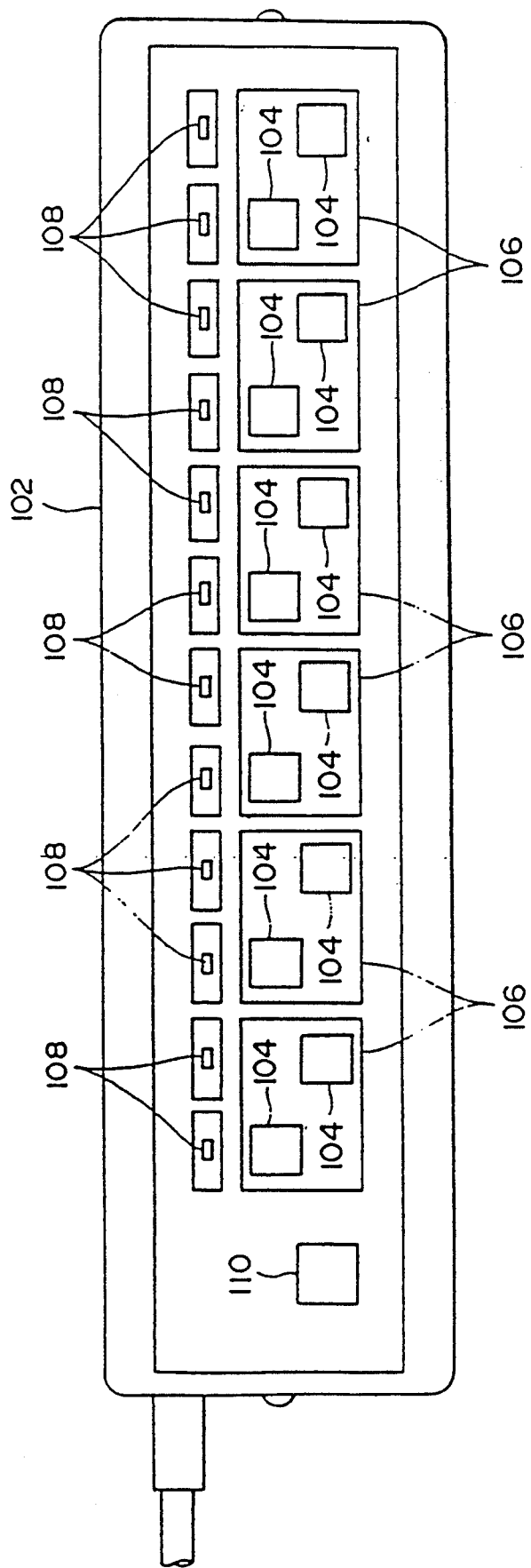
Figure 9:
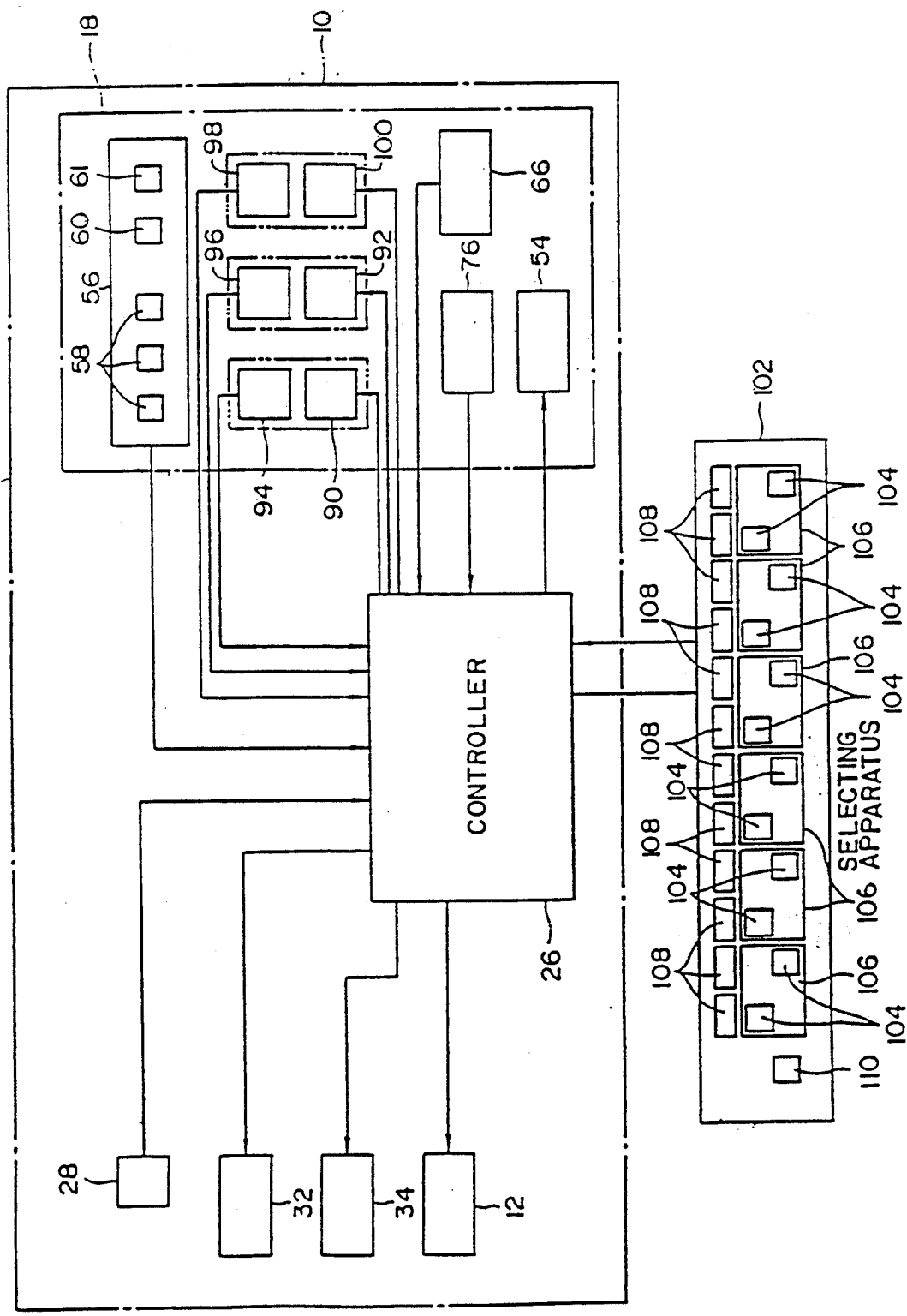

FIGS. 7 to 9 illustrate the photographic printer 10 to which the image frame selecting apparatus in accordance with a second embodiment is applied. In this embodiment, the arrangement of the photographic printer 10 is identical with that of the photographic printer 10 used in the first embodiment except that a collectively selecting switch 109 is present on the image frame selecting apparatus 102. Accordingly, a description of the components and operation that are identical with those of the photographic printer 10 in the first embodiment will be omitted.

As shown in FIGS. 7 and 8, a collectively selecting switch 109 which is a collective designation operating portion is provided on the image frame selecting apparatus 102 on the right-hand side of the rightmost frame 106 in FIG. 4. The arrangement is such that the same signal as that obtained when all the aforementioned individual selection switches 104 on the selecting apparatus 102 are operated is suppled to the control unit 26 if this collectively selecting switch 109 is pressed. In other words, there is much demand for effecting extra printing of all the images photographed on the short negative film 20S, and if all the individual selection switches 104 for respective frames are operated, it is necessary to press the switches six times in the case of a full size and 12 times in the case of a half size. In this embodiment, the provision of the collectively selecting switch 109 permits the selection of all the image frames 20A on the short negative film 20S through a single operation.

Figure 10:
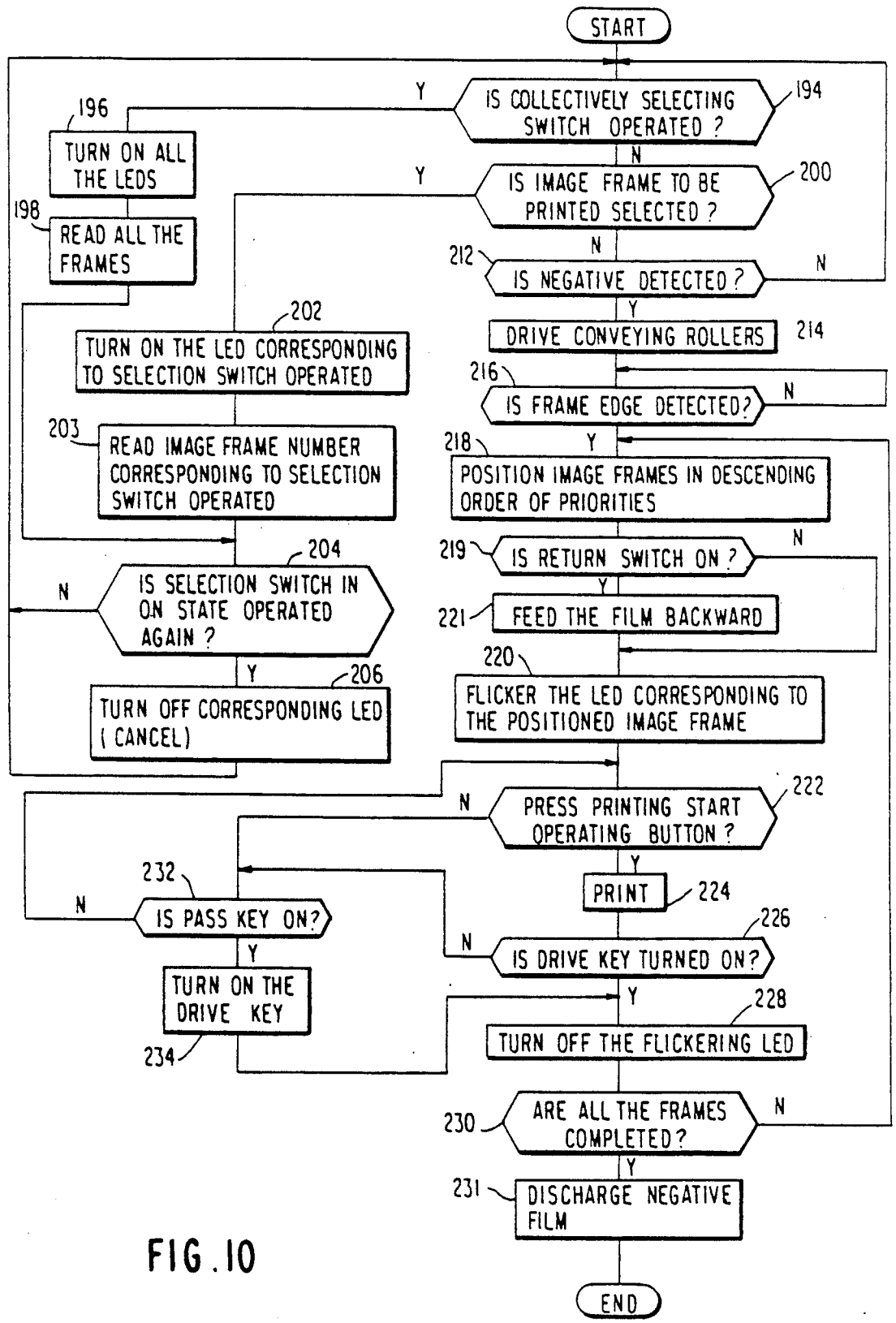

Referring now to the flowchart shown in FIG. 10, a description will be given of the case of effecting printing processing by using the short negative film 20S in accordance with this embodiment. Since this flowchart is identical with the one shown in FIG. 6 with the exception of Steps 194, 196 and 198, a description of the identical steps will be omitted.

First, in Step 194, a determination is made as to whether or not the collectively selecting switch 109 on the selecting apparatus 102 has been operated. If YES is the answer, a determination is made that all the image frames on the short negative film 20S (six frames in the case of the full size and 12 frames in the case of the half size) are to be printed, and the operation proceeds to Step 196 to turn on all the LEDs 108. Subsequently, after information on the selection of all the image frames is sent to the control unit 26 in Step 198, the operation proceeds to Step 204.

On the other hand, in a case where NO is the answer in Step 194, the operation proceeds to Step 200.

In Step 204 after Step 198 or 203, if it is desired to cancel the image frame 20A once selected, by operating again the individual selection switch 104 concerned, the corresponding LED 108 is turned off (Step 206), so that the selected image frame 20A can be canceled. Thereafter, it is possible to select a plurality of image frames 20A by repeating Steps 200 through 206.

At this juncture, if, by making use of the above-described canceling function, all the image frames are designated in Step 194 and an individual selection switch 104 corresponding to the image frame for which printing is not required is operated, it is possible to effect the operation of selecting for instance, five frames in the case of a full size through two operations (i.e., one operation each of the collectively selecting switch 109 and the individual selection switch 104 corresponding to the frame for which printing is not required). Thus, the operating efficiency in selection can be improved.

Thus, in this embodiment, by virtue of the provision of the collectively selecting switch 109, it is possible to improve the operating efficiency in selection can be improved since the selection of all the image frames 20A on the short negative film 20S can be effected by one operation.

As described above, the image frame selecting apparatus for a photographic printer offers an outstanding advantage in that, by designating image frames to be printed among the image frames on a short photographic film, it is possible to automatically position the designated image frames consecutively to a printing position, thereby improving the operating efficiency.

In addition, the image frame selecting apparatus in accordance with the present invention offers another outstanding advantage in that in a case where all the image frames on the short photographic film are to be printed, it is possible to effect the selecting operations collectively, thereby improving the operating efficiency in selection.

What is claimed is:

1. An image frame selecting apparatus for a photographic printer, having a printing position, which is operative to designate at least one selected image frame to be printed among plural image frames serially arranged as a short photographic film, comprising:

operating means for selecting from the plural image frames on said short film an image frame to be printed, said operating means having a plurality of operating elements that are the same in number as said image frames on said short photographic film and which are arranged and ordered to correspond with the arrangement and order of said image frames of said short photographic film;

image frame designating means for individually designating each of said image frames in correspondence with said operating elements of said operating means;

conveying means for conveying said short photographic film; and controlling means responsive to said operating means and said designating means for controlling said conveying means in such a manner that said image frame designated by said image frame designating means is positioned to said printing position, whereby said designated image frames to be printed are consecutively positioned automatically to said printing position.

2. An image frame selecting apparatus for a photographic printer according to claim 1, further comprising:

collective designation operating means for collectively designating all said image frames of said short photographic film as image frames to be printed.

3. An image frame selecting apparatus for a photographic printer according to claim 1, wherein said operating means are constituted by keys for designating corresponding image frames to be printed of said short photographic film.

4. An image frame selecting apparatus for a photographic printer according to claim 3, wherein frames each having the substantially same size as said image frame are formed on said operating means, said key being disposed within said frame.

5. An image frame selecting apparatus for a photographic printer according to claim 4, wherein two keys are disposed within each of said frames in such a manner as to be capable of coping with both full-size and half-size films.

6. An image frame selecting apparatus for a photographic printer according to claim 1, wherein said operating means and said image frame designating means are disposed in one body and are separatively disposed with respect to a negative carrier.

7. An image frame selecting apparatus for a photographic printer according to claim 1, further comprising:

returning means capable of returning said short photographic film along a conveying passage so as to print an image frame which has passed a printing section.

8. An image frame selecting apparatus for a photographic printer according to claim 2, further comprising:

canceling means for canceling the designation of an image frame for which printing is not required after all said image frames of said short photographic film have been designated.

9. An image-frame selecting apparatus for a photographic printer according to claim 3, wherein said operating means are provided with display portions the number of which is identical with that of said keys, each of said display portions being adapted to display a state of said short photographic film to be printed.

10. An image frame selecting apparatus for a photographic printer according to claim 3, further comprising:

first display means which is operated when said key corresponding to said image frame to be printed of said short photographic film is operated.

11. An image frame selecting apparatus for a photographic printer according to claim 10, further comprising:

second display means which is operated when said image frame to be printed of said short photographic film is positioned with respect to an optical axis of said photographic printer.

12. An image frame selecting apparatus for a photographic printer according to claim 11, further comprising:

third display means which is operated when the printing of said designated image frame of said short photographic film is completed.

13. An image frame selecting apparatus for a photographic printer according to claim 9, wherein said display portions comprise light-emitting diodes emitting different colors of light depending on the frame size of said short photographic film.

14. An image frame selecting apparatus for a photographic printer, having a printing position, which is operative to designate at least one selected image frame to be printed among a plurality of image frames serially arranged on a short photographic film having a predetermined length, comprising:

operating means comprising a selection surface having the same length as the predetermined length of said short photographic film and comprising a plurality of operating portions arranged in correspondence with said image frames of short photographic film, said operating means being operative to select an image frame to be printed;

image frame designating means for designating said image frame selected by said operating means and for outputting a designating information of said image frame;

conveying means for conveying said short photographic film; and controlling means for receiving said designating output from said image frame designating means, and for controlling said conveying means in such a manner that said designated image frame is positioned to a printing position in accordance with said output designating information, whereby said designated image frames to be printed are consecutively positioned automatically to the printing position.

15. An image frame selecting apparatus for a photographic printer according to claim 14, further comprising:

first display means which is operated when a portion of said operating means corresponding to said image frame to be printed of said short photographic film is operated.

16. An image frame selecting apparatus for a photographic printer according to claim 14, further comprising:

second display means which is operated when said image frame to be printed of said short photographic film is positioned with respect to an optical axis of said photographic printer.

17. An image frame selecting apparatus for a photographic printer according to claim 14, further comprising:

third display means which is operated when the printing of said designated image frame of said short photographic film is completed.

* * * * *